(12) United States Patent
Baron et al.

(10) Patent No.: US 11,230,482 B2
(45) Date of Patent: Jan. 25, 2022

(54) SYSTEMS AND METHODS FOR CONTROLLING A CHLORAMINE SYNTHESIS REACTION IN INDUSTRIAL WATER SYSTEMS

(71) Applicant: CHEMTREAT, INC., Glen Allen, VA (US)

(72) Inventors: Christopher Baron, Newark, DE (US); Joseph Konefal, Glen Allen, VA (US); Blaine Nagao, Hillsboro, TX (US)

(73) Assignee: CHEMTREAT, INC., Glen Allen, VA (US)

( * ) Notice: Subject to any disclaimer, the term of this patent is extended or adjusted under 35 U.S.C. 154(b) by 68 days.

(21) Appl. No.: 16/844,230

(22) Filed: Apr. 9, 2020

(65) Prior Publication Data

US 2020/0325048 A1 Oct. 15, 2020

Related U.S. Application Data

(60) Provisional application No. 62/831,452, filed on Apr. 9, 2019.

(51) Int. Cl.
*C02F 1/76* (2006.01)
*C02F 1/00* (2006.01)
(Continued)

(52) U.S. Cl.
CPC .............. *C02F 1/76* (2013.01); *A01N 59/00* (2013.01); *C02F 1/008* (2013.01);
(Continued)

(58) Field of Classification Search
None
See application file for complete search history.

(56) References Cited

U.S. PATENT DOCUMENTS

| 7,052,614 | B2 | 5/2006 | Barak |
| 7,189,329 | B2 | 3/2007 | Barak |

(Continued)

OTHER PUBLICATIONS

'How to test for chlorine in water' Apps Laboratories, 2002 [retrieved from the internet on Jun. 18, 2020 (Jun. 18, 2020) at <http://appslabs.com.au/chlorine.htm>] para 9.

(Continued)

*Primary Examiner* — Richard C Gurtowski
(74) *Attorney, Agent, or Firm* — Oliff PLC

(57) ABSTRACT

Systems and methods for controlling a chloramine synthesis reaction. The system includes at least one water pump configured to deliver a first water stream to a first junction where the first water stream is mixed with a first solution including an ammonium compound, and a second water stream to a second junction where the second water stream is mixed with a second solution including hypochlorite, a reaction chamber downstream of the first and second junctions which is configured to mix the first and second water streams in order to react the ammonium compound and the hypochlorite to form chloramine, an optical measurement device disposed upstream of the second junction, the optical measurement device configured to measure an absorbance of the hypochlorite in the second solution, and at least one controller programmed to determine a concentration of the hypochlorite in the second solution based on the measured absorbance.

22 Claims, 1 Drawing Sheet

(51) Int. Cl.
*A01N 59/00* (2006.01)
*C02F 103/02* (2006.01)

(52) U.S. Cl.
CPC .... *C02F 2103/023* (2013.01); *C02F 2209/14* (2013.01); *C02F 2209/29* (2013.01); *C02F 2209/40* (2013.01); *C02F 2303/04* (2013.01)

(56) References Cited

U.S. PATENT DOCUMENTS

| | | | |
|---|---|---|---|
| 7,628,929 | B2 | 12/2009 | Barak |
| 7,927,496 | B2 | 4/2011 | Barak |
| 8,168,072 | B2 | 5/2012 | Barak |
| 8,444,858 | B2 | 5/2013 | Barak |
| 2008/0160604 | A1 | 7/2008 | Gupta et al. |
| 2014/0034576 | A1* | 2/2014 | Gore .................... B01J 20/0233 210/660 |
| 2015/0203388 | A1 | 7/2015 | Gotthardt et al. |
| 2017/0367343 | A1 | 12/2017 | Barak |

OTHER PUBLICATIONS

International Searching Authority, Notification of Transmittal of the International Search Report and the Written Opinion of the International Searching Authority, or the Declaration, dated Jul. 9, 2020, pp. 7.

Torrey , et al., "'Effect of Chlorine vs. Chloramine Treatment Techniques on Materials Degradation in Reclamation Infrastructure'", Sep. 2013 (Sep. 2013), U.S. Department of the Interior Bureau of Reclamation Technical , Memorandum No. MERL-2013-57 [retrieved from the internet on Jun. 22, 2020 (Jun. 22, 2020) at <https://www.usbr.gov/research/projects/download_product.cfm?id=826>].

* cited by examiner

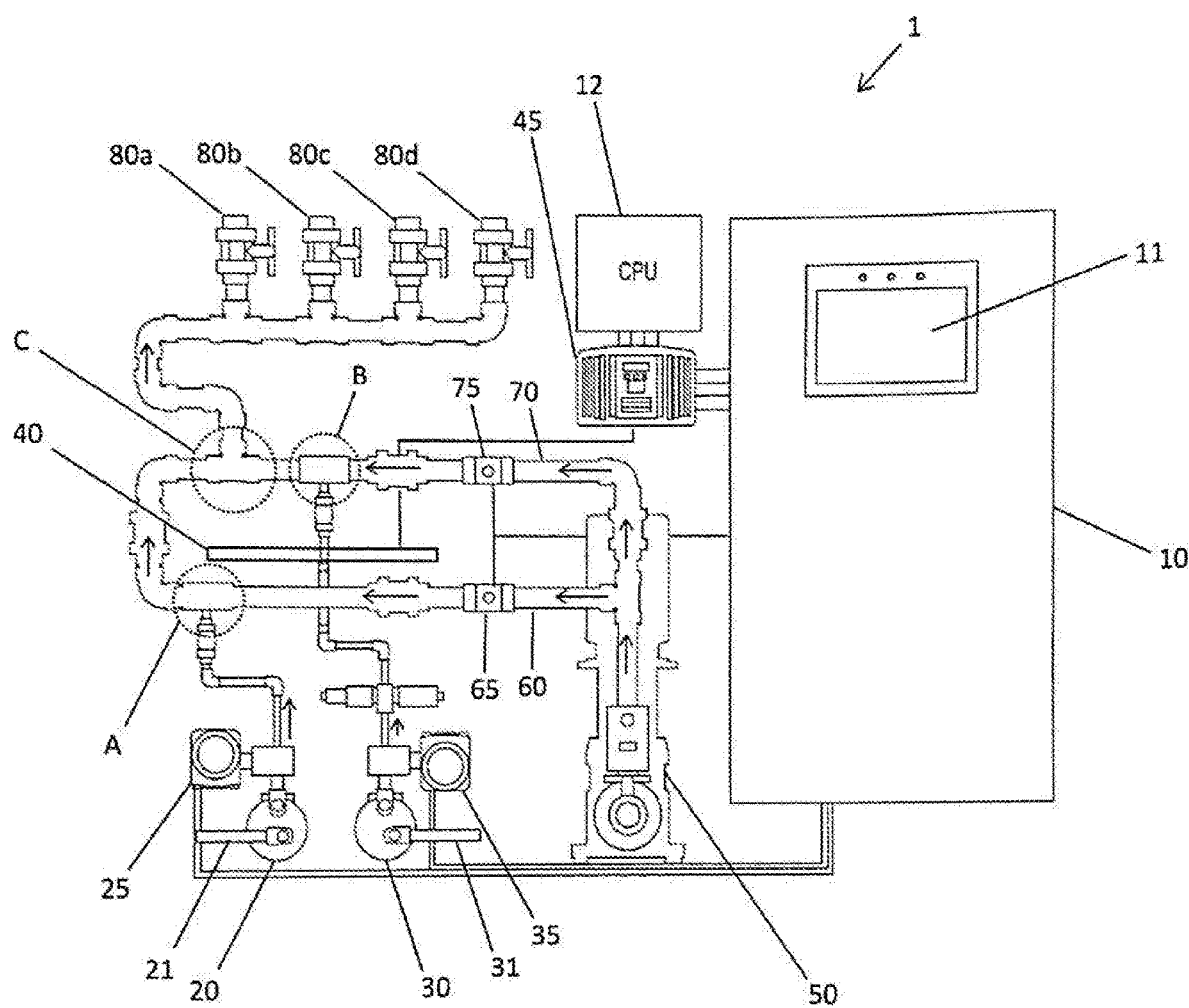

SYSTEMS AND METHODS FOR CONTROLLING A CHLORAMINE SYNTHESIS REACTION IN INDUSTRIAL WATER SYSTEMS

This application claims priority to Provisional Application No. 62/831,452, filed Apr. 9, 2019. The entire contents of the prior application are hereby incorporated by reference herein in their entirety.

TECHNICAL FIELD

This application is directed to systems and methods for controlling a chloramine synthesis reaction by controlling the amount of precursors used in the chloramine synthesis.

BACKGROUND

Biofouling is a detrimental type of fouling experienced in industrial water treatment applications. Regardless of industry, water treatment experts spend a considerable amount of time focused on preventing biofouling of heat exchangers, cooling towers, process water storage vessels, and other areas serviced by various industrial cooling and process waters. When biofouled, poorly performing heat exchangers and cooling towers can lead to millions of dollars in lost revenues, and uncontrolled corrosion on metal surfaces can lead to unplanned downtime and accelerated capital expenditures.

The use of biocides, such as chloramines, for microbiological control in industrial applications is well known. Chloramines may be formed from water ($H_2O$), sodium hypochlorite (NaOCl) (bleach, or hypo), and an ammonium salt, such as ammonium sulfate (($NH_4$)$_2SO_4$). The chloramine solution produced from the combination of these reagents is then able to be used as a cleaning agent or as a biocide for cooling and process waters. Chloramines may include monochloramine, dichloramine, trichloramine and organic chloramines. Chloramines provide long-lasting protection against microbial contamination and are more stable than pure chlorine products as they may not break down as quickly in cooling and process water systems.

As the salt of sulfuric acid (strong acid) and ammonia (a weak base) ammonium sulfate forms an acidic solution when added to water. For this reason, ammonium sulfate is known to be highly corrosive. Moreover, ammonium sulfate is also known to fuel microbial growth. Thus, there is a significant need in the water treatment industry to monitor and control the amount of ammonium sulfate applied in the synthesis of chloramine in water systems.

Conventional systems and methods for controlling the amount of ammonium sulfate in a water system include measuring the pH of the outflow, measuring the heat of the chloramine reaction, and no control process at all. Additionally, chloramine synthesis technology utilizing narrow parameters for input ratios of precursors exist but lack in quantitative precision and accuracy. No automated on-line system currently exists for the quantitative measurement and control of ammonium sulfate concentration in chloramine-treated water systems. Further, it is known that bleach, one of the components in the chloramine synthesis reaction, is highly reactive and unstable, thereby limiting options for safe and effective on-site storage. In this regard, the known methods have significant drawbacks when it comes to overall efficacy, safety, cost and delivery. These and other objectives are addressed by the disclosed embodiments.

SUMMARY

It is an object of the disclosed embodiments to provide for the quantitative conversion of sodium hypochlorite to chloramine in a controlled fashion. The disclosed systems and methods reduce reliance on frequent calibration of a pH electrode, and are capable of using a variety of ammonium salts as precursors. They can also deliver a much wider range of chemical feed rates than current equipment. The systems and methods allow for monitoring the concentration of sodium hypochlorite in real time and adjusting the flow of precursor chemicals to ensure that the desired molar ratio of the reagents is added. They also provide mechanisms for enhancing the kinetics of the chloramine reaction to ensure that the proper products are produced.

In a first embodiment, there is provided a system for controlling a chloramine synthesis reaction in a hard water stream. The system comprises at least one water pump configured to deliver (i) a first water stream to a first junction where the first water stream is mixed with a first solution including an ammonium compound, and (ii) a second water stream to a second junction where the second water stream is mixed with a second solution including hypochlorite, a reaction chamber downstream of the first junction and the second junction which is configured to mix the first water stream and the second water stream in order to react the ammonium compound and the hypochlorite to form chloramine in an outflow water stream, an optical measurement device disposed upstream of the second junction, the optical measurement device configured to measure an absorbance of the hypochlorite in the second solution, and at least one controller programmed to determine a concentration of the hypochlorite in the second solution based on the measured absorbance.

In another embodiment, there is provided a method for controlling a chloramine synthesis reaction in a hard water stream. The method comprises delivering (i) a first water stream to a first junction where the first water stream is mixed with a first solution including an ammonium compound, and (ii) a second water stream to a second junction where the second water stream is mixed with a second solution including hypochlorite, mixing the first water stream and the second water stream downstream of the first junction and the second junction in order to react the ammonium compound and the hypochlorite to form chloramine in an outflow water stream, measuring a concentration of the hypochlorite in the second solution at a position upstream of the second junction, and determining and adjusting at least one of a flow rate of the second solution and a concentration of the hypochlorite in the second solution based on the measured concentration of hypochlorite in the second solution.

BRIEF DESCRIPTION OF THE DRAWINGS

Illustration of the disclosed embodiments is made with reference to the following figures.

FIG. 1 is a front view of a chemical feed system according to an embodiment.

DETAILED DESCRIPTION

The disclosed embodiments provide systems and methods for controlling a chloramine synthesis reaction by controlling the amount of precursors used in the chloramine synthesis for applications in, for example, industrial cooling and process water systems. The disclosed systems and methods may include a chemical feed system that monitors the concentration of a chemical, e.g., sodium hypochlorite, in real-time and adjusts the flow of chemicals to ensure that the correct molar ratio of the reagents is added. It also provides for turbulent flow where the reagents combine that helps control the kinetics of the reaction to ensure that the desired products are produced. The chemical feed system may include a chemical quantification device such as a spectrophotometer or the like.

Chloramine Synthesis

In embodiments, a first compound is reacted with a second compound to generate chloramine. The first compound may be an ammonium salt and the second compound may be a hypochlorite salt, such as a sodium hypochlorite. For purposes of this disclosure, the hypochlorite salt will be described with reference to industrial bleach which usually has a hypochlorite concentration of about 12%, user-dilution notwithstanding. However, suitable hypochlorite concentrations may include those ranging from 2% to 18%, 8% to 12.5%, 10% to 18%, 12.5% to 18%, and 12.5% to 13%, as will be recognized by one of ordinary skill in the art. In embodiments, the bleach may be diluted to be in a range of 1,000 to 10,000 parts per million (μg/g, or ppm) expressed in terms of the DPD-based method for Total Oxidizing Chlorine.

For purposes of this disclosure, the ammonium salt will be described with reference to ammonium sulfate (($NH_4)_2SO_4$). But it will be understood that the ammonium salt may be any suitable salt including, but not limited to, ammonium hydroxide ($NH_4OH$), ammonium chloride ($NH_4Cl$), ammonium bromide ($NH_4Br$), ammonium carbonate (($NH_4)_2CO_3$), ammonium nitrate ($NH_4NO_3$), and mixtures thereof.

The ammonium salt and hypochlorite/hypochlorous acid react in water to form chloramine according to the following general reaction:

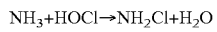

$$NH_3 + HOCl \rightarrow NH_2Cl + H_2O$$

This reaction proceeds ideally at a 1:1 molar concentration of the ammonium salt to hypochlorite at a pH of 9.0 or higher to form monochloramine. However, other molar ratios are suitable for application in disclosed embodiments. For example, the ammonium salt and the sodium hypochlorite may be mixed in a molar ratio of 1:1 to 1:3, 1:1 to 1:2, 0.9:1 to 1.5:1, 1:1 to 1:1.4, or 1:1 to 1:1.1. In this regard, it should be recognized that the formation of dichloramine and trichloramine are also contemplated, despite the potentially undesirable properties of dichloramine and trichloramine, which are known to be unstable and require unsuitable reaction conditions (e.g., driving the pH very low).

Under disclosed conditions, it is preferable to generate chloramine at a concentration in the range of 100 ppm to 5,000 ppm, 1,000 ppm to 5,000 ppm, 1,500 ppm to 5,000 ppm, 2,500 ppm to 5,000 ppm, 3,500 ppm to 5,000 ppm, or 4,500 ppm to 5,000 ppm. Driving the reaction to generate chloramine at a concentration above 5,000 ppm can destabilize the chloramine and generate unwanted acid, nitrogen gas and a mixture of oxidizing halogen products that can include chlorine gas. Producing chloramine at concentrations below desired thresholds may result in less effective biocidal effectiveness.

The Chemical Feed System

As seen in FIG. 1, the chemical feed system 1 according to embodiments includes a chemical feed system control unit 10, a water pump 50, a first chemical pump 20, a second chemical pump 30 and an optical measurement device 40. Each of the first chemical pump 20 and the second chemical pump 30 are provided with corresponding first storage container 21 and second storage container 31, respectively, and first chemical pump control unit 25 and second chemical pump control unit 35, respectively. The optical measurement device 40 is provided with a corresponding optical measurement device control unit 45. The chemical feed system control unit 10 is provided with a user interface 11. A CPU 12 having a processor, memory, storage and network adaptors is provided for processing system data and coordinating the chemical feed system control unit 10 and optical measurement device control unit 45. Outlets 80a, 80b, 80c and 80d, with valves, are provided for selectively delivering treated water to various lines outside the system 1. Operation of the chemical feed system 1 will now be described with further reference to FIG. 1

During operation, water is pumped from a water source via the water pump 50 into the system 1 and flows through a piping architecture as illustrated by the arrows in FIG. 1. Namely, water flows through first flow path 60 and second flow path 70. Flow meters 65 and 75 monitor the flow rate of the water through the first flow path 60 and second flow path 70, respectively, and provide this input to the control unit 10 for processing. The flow meters 65 and 75 ensure that the proper flow rate is achieved in each of the first flow path 60 and second flow path 70. Meanwhile, a solution including a first chemical compound is input from the first storage container 21 into the system 1 through a first chemical pump 20 and a solution including a second chemical compound is input from the second storage container 31 into the system 1 through a second chemical pump 30. First chemical pump control unit 25 and second chemical pump control unit 35 are provided to control the flow rate of the first solution and the second solution, respectively, and provide this input to the control unit 10 for processing. The first chemical pump control unit 25 and second chemical pump control unit 35 may also be equipped to control the concentration of the first chemical compound and the second chemical compound in the first solution and the second solution, respectively, by, for example, mixing respective solid phase precursor compounds with a water source in desired ratios, and providing this input to the control unit 10 for processing.

The first solution and second solution flow through the piping architecture as illustrated by the arrows in FIG. 1. The optical measurement device 40 is provided along the flow path of the second chemical reagent in order to analyze a concentration of the compound in the flow path. Input from the optical measurement device 40 is provided to the control unit 45 for further processing. Alternatively, the optical measurement device 40 could be positioned on the flow path of the first chemical reagent, or on both paths of the reagents, as appropriate.

With the first solution and second solution flowing into the system, the first and second solution merge and mix with the influent water streams in first flow path 60 and second flow path 70 at junctions A and B, respectively, to form respective first and second mixed streams. The mixed streams are subsequently merged at junction C allowing the first and second compounds to react, thus forming a treated stream, as shown in FIG. 1. The treated stream is output via any one or more outlets 80a, 80b, 80c and 80d as an outflow water stream.

The optical measurement device 40 is a device used in the quantitative measurement of an optical parameter of a compound in a transfer medium such as a liquid medium. For example, the optical measurement device 40 may measure the absorption of the hypochlorite in the second flow path. Although the optical measurement device 40 can be positioned at different locations along the flow path, it is preferably positioned upstream of any portion that mixes with water, i.e., upstream of junction B.

The optical measurement device may include, but is not limited to, a spectrophotometer, a colorimeter, or a fluorimeter. A spectrophotometer measures the absorption properties of a material as a function of wavelength. These techniques determine the concentration of a sample, which has a color that may or may not be visible to the naked eye. In a basic spectrometer, there is a light source, absorption cell and a detector. The radiation beam of the tunable light source passes through the sample in a cell, and the transmitted intensity is measured by the detector. Variation of the signal intensity as the frequency of the radiation is scanned is called the spectrum.

A colorimeter may include, as a light source, a low filament lamp, a set of color filters, and a filter that is selected according to the reagent of interest. Similar to a spectrophotometer, a detector measures the transmitted light in a colorimeter. A fluorimeter is a device used to measure parameters of fluorescence, i.e., its intensity and wavelength distribution of emission spectrum after excitation by a certain spectrum of light. These parameters are used to identify the presence and the amount of the reagents in the flow paths. In embodiments, the optical measurement device is preferably a spectrophotometer.

Hypochlorite exhibits a specific peak absorption wavelength. The concentration of the hypochlorite in the sample may be determined by any suitable means known in the art such as, for example, correlating the absorbance value at a given wavelength (not necessarily the peak wavelength) read from the sample with a standard curve generated for known hypochlorite concentrations at the given wavelength.

Control Mechanisms

It is desirable to achieve stoichiometric optimization of the ammonium salt and an active form of hypochlorite in generating chloramine according to embodiments. It is an object of the disclosed embodiments to control the stoichiometry of the chloramine reaction to achieve such optimization. In conventional processes that lack such control, overfeeding of one or both of the ammonium salt and the hypochlorite is a common practice. Conventional belief is that such overfeeding somehow "ensures" that enough chemicals are added to produce the desired reaction. However, this uncontrolled overfeeding can result in stoichiometric excess of either the ammonium salt or hypochlorite, thereby producing undesired effects. For example, excess ammonium salt in the water system increases microbial growth and corrosion, which are highly undesirable. In turn, excess hypochlorite in the water system also increases corrosion and may decrease the relative microbial control capacity of the hypochlorite.

Lack of stoichiometric control in conventional processes results in uncontrolled chloramine end product. This means that the desired levels of chloramine in the water system cannot be achieved. Excess chloramines in a water system may have negative health effects and deficient levels of chloramines in a water system do not produce the desired biocidal effects.

Additionally, bleach is highly unstable. In this regard, bleach will rapidly and almost completely oxidize into chloride. Industrial or concentrated bleach has a short shelf-life and will quickly degrade (e.g., in 1 to 2 months) under standard storage conditions, i.e., storage tanks of industrial water systems exposed to heat, etc.

Upon contact of hypochlorite with water, particularly hard water, scaling and corrosion begin. Hardness is caused by compounds of calcium and magnesium, and by a variety of other metals. General guidelines for classification of hardness in water are as follows: 0 to 60 mg/L (milligrams per liter) as calcium carbonate is classified as soft, 61 to 120 mg/L as moderately hard, 121 to 180 mg/L as hard, and more than 180 mg/L as very hard. Such unwanted scaling and corrosion may interfere with controlled and accurate measurement of compound concentrations in water systems. Since it is important to control the reaction conditions and amounts of the respective compounds on-site and in real-time to optimize the chloramine synthesis reaction, the disclosed systems and methods are uniquely configured to address these concerns in a number of ways.

In this regard, the optical measurement device 40 can be positioned at the inflow portion of the system before the hypochlorite is exposed to water, before it reacts with the ammonium sulfate, anywhere and before scaling of the optical path begins. This reduces the likelihood of scaling interfering with the measurement of the hypochlorite concentration as compared with measuring the concentration downstream after mixing with water or reactants. It also reduces the problems associated with measuring other parameters downstream such as measuring pH using pH electrodes, as is done conventionally. Scale formation on pH electrodes significantly degrades measurement quality, as is well understood in the art.

Additionally, the configuration of the piping architecture, and particularly the junction C (i.e., a "T" junction), causes turbulent fluid flow dynamics where the first solution including the ammonium sulfate and the second solution including the hypochlorite meet and react. These turbulent fluid flow dynamics increase and simplify the kinetics of the reaction thereby ensuring quick (i.e., <1 second) and substantially complete reactions using up each of the precursor compounds and reducing unwanted residual ammonium sulfate and hypochlorite, and minimizing/eliminating the formation of any undesired side products.

The disclosed control "network," i.e., the first chemical pump control unit 25, second chemical pump control unit 35, flow meters 65 and 75, chemical feed system control unit 10, and spectrophotometer control unit 45 are configured to work independently or collectively via the CPU 12 to monitor and adjust the concentrations and flow rates of the ammonium sulfate and hypochlorite that enter the system based in part on the measured hypochlorite concentration.

Furthermore, the user interface 11 allows a user to set predetermined conditions and manage operational conditions over time. According to embodiments, a user is able to set initial conditions for the chemical feed system at an initial time and the system will adapt over time to any changes in the hypochlorite concentration due to, e.g., degradation and/or supply source turnover (i.e., changing or refilling the bleach storage vessel). The CPU 12 may be programmed with adaptive control logic to control the system through iterative cycles of the chemical feed system using machine learning techniques or the like.

Operation of the disclosed control "network" will now be described with reference to the following example scenarios. Once the disclosed chemical feed system 1 is installed on site with the one or more outlets 80*a*, 80*b*, 80*c* and 80*d* fluidly connected to the water system to be treated and the water pump 50 fluidly connected to a water source, a user loads storage container 21 with ammonium salt solution and storage container 31 with bleach solution and sets an initial flow rate for the first flow path and second flow path via the user interface 11 based on a desired chloramine amount for the water system to be treated. The CPU 11 stores these initial settings in memory and sends an instruction via network adapters to water pump 50 to begin the water flow, and the chemical control pumps 25 and 35 to begin pumping the pumps 20 and 30 at the desired flow rate. The optical measurement device 40 takes an initial absorbance reading of the hypochlorite in the second flow path and reports this value to the CPU 11 which stores the value in memory and computes the corresponding concentration associated with the read absorbance. The chloramine reaction then proceeds as described herein. Over time, several subsequent scenarios are possible.

For example, due to the high instability of bleach, the bleach in the storage container 31 may degrade. If this happens, the concentration of the active form of hypochlorite will decrease. Because the optical measurement device 40 monitors the absorbance of hypochlorite in the second flow path in real-time, and sends a signal to the CPU 11 in real-time, the CPU 11 will detect this change in concentration and store the subsequent values in memory. In turn, the CPU 11 will send a signal to the chemical control pump 35 to increase the flow rate of the pump 30 to accommodate the change in concentration in order to maintain stoichiometric optimization.

As another example, after initial operation, the bleach in the storage container 31 may be depleted and it would be necessary to refill or replace the storage container 31 with a new batch of bleach. In a fashion similar to that described above, the chemical feed system will adjust to any change in concentration as a result of a new bleach source and adjust flow rates accordingly to maintain stoichiometric optimization.

In these examples, the flow rate of the chemical control pump 25 controlling the flow rate of the ammonium salt solution is held constant. But it will be recognized that this flow rate and/or the concentrations of either or both of the first and second solutions may also be adjusted in real-time.

It will be appreciated that the above-disclosed features and functions, or alternatives thereof, may be desirably combined into different systems or methods. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A system for controlling a chloramine synthesis reaction in a hard water stream, the system comprising:
    at least one water pump configured to deliver (i) a first water stream to a first junction where the first water stream is mixed with a first solution including an ammonium compound, and (ii) a second water stream to a second junction where the second water stream is mixed with a second solution including hypochlorite;
    a reaction chamber downstream of the first junction and the second junction which is configured to mix the first water stream and the second water stream in order to react the ammonium compound and the hypochlorite to form chloramine in an outflow water stream;
    an optical measurement device disposed upstream of the second junction, the optical measurement device configured to measure an absorbance of the hypochlorite in the second solution; and
    at least one controller programmed to determine and adjust at least one of a flow rate of the second solution and a concentration of the hypochlorite in the second solution based on the measured absorbance.

2. The system for controlling a chloramine synthesis reaction according to claim 1, wherein the least one controller adjusts the at least one of the flow rate of the second solution and the concentration of the hypochlorite in the second solution based on a target concentration of chloramine in the outflow water stream.

3. The system for controlling a chloramine synthesis reaction according to claim 1, wherein the at least one controller is further programmed to adjust at least one of a flow rate of the first solution and a concentration of the ammonium compound in the first solution.

4. The system for controlling a chloramine synthesis reaction according to claim 3, wherein the least one controller is further programmed to adjust the at least one of the flow rate of the first solution and the concentration of the ammonium compound in the first solution based on (i) the determined concentration of the hypochlorite and (ii) a target concentration of chloramine in the outflow water stream.

5. The system for controlling a chloramine synthesis reaction according to claim 1, wherein the optical measurement device is a spectrophotometer.

6. The system for controlling a chloramine synthesis reaction according to claim 1, wherein the reaction chamber is further configured to cause turbulent flow where the first water stream and the second water stream are mixed.

7. The system for controlling a chloramine synthesis reaction according to claim 3, further comprising a first flow controller configured to adjust the flow rate of the first solution.

8. The system for controlling a chloramine synthesis reaction according to claim 2, further comprising a second flow controller configured to adjust the flow rate of the second solution.

9. The system for controlling a chloramine synthesis reaction according to claim 1, further comprising a first storage container configured to store the first solution including the ammonium compound upstream of the first junction.

10. The system for controlling a chloramine synthesis reaction according to claim 1, further comprising a second storage container configured to store the second solution including the hypochlorite upstream of the optical measurement device.

11. The system for controlling a chloramine synthesis reaction according to claim 1, further comprising a first flow meter for monitoring a flow rate of the first water stream and a second flow meter for monitoring a flow rate of the second water stream.

12. The system for controlling a chloramine synthesis reaction according to claim 1, wherein the at least one controller adjusts the at least one of the flow rate of the second solution and the concentration of the hypochlorite in the second solution in real-time without user intervention.

13. A method for controlling a chloramine synthesis reaction in a hard water stream, the method comprising:
    delivering (i) a first water stream to a first junction where the first water stream is mixed with a first solution including an ammonium compound, and (ii) a second water stream to a second junction where the second water stream is mixed with a second solution including hypochlorite;
    mixing the first water stream and the second water stream downstream of the first junction and the second junction in order to react the ammonium compound and the hypochlorite to form chloramine in an outflow water stream;

measuring an absorbance of the hypochlorite in the second solution at a position upstream of the second junction; and determining and adjusting at least one of a flow rate of the second solution and a concentration of the hypochlorite in the second solution based on the measured absorbance.

14. The method for controlling a chloramine synthesis reaction according to claim 13, wherein the ammonium compound is at least one compound selected from the group consisting of ammonium sulfate, ammonium hydroxide, ammonium chloride, ammonium bromide, ammonium nitrate, and ammonium carbonate.

15. The method for controlling a chloramine synthesis reaction according to claim 13, wherein the ammonium compound is ammonium sulfate.

16. The method for controlling a chloramine synthesis reaction according to claim 13, wherein the hypochlorite is sodium hypochlorite.

17. The method for controlling a chloramine synthesis reaction according to claim 13, wherein the at least one of the flow rate of the second solution and the concentration of the hypochlorite in the second solution is adjusted based on a target concentration of chloramine in the outflow water stream.

18. The method for controlling a chloramine synthesis reaction according to claim 17, wherein the target concentration of chloramine in the outflow water stream is in a range of 100 ppm to 5,000 ppm expressed in terms of total oxidizing chlorine measured using a DPD-based chemical test.

19. The method for controlling a chloramine synthesis reaction according to claim 13, wherein a concentration of the hypochlorite in the second solution is in range of 2% to 18%.

20. The method for controlling a chloramine synthesis reaction according to claim 13, wherein the outflow stream is infused into an industrial water system as a biocidal treatment.

21. The method for controlling a chloramine synthesis reaction according to claim 13, wherein a flow rate of the first solution is held constant while the flow rate of the second solution is adjusted based on the measured concentration of hypochlorite in the second solution.

22. The method for controlling a chloramine synthesis reaction according to claim 13, wherein the first water stream and the second water stream are mixed downstream of the first junction and the second junction so that a molar ratio of the ammonium compound to the hypochlorite is about 1:1.

* * * * *